United States Patent
Koski et al.

(10) Patent No.: US 6,622,113 B2
(45) Date of Patent: Sep. 16, 2003

(54) METHOD AND APPARATUS FOR DETECTING AND COMPUTING TAPE REEL RADIUS USING LOW-RESOLUTION ANGULAR POSITION SENSORS

(75) Inventors: John Alexander Koski, Tucson, AZ (US); Akimitsu Sasaki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 09/886,298

(22) Filed: Jun. 21, 2001

(65) Prior Publication Data

US 2002/0198678 A1 Dec. 26, 2002

(51) Int. Cl.[7] .............................................. G01C 0/7100
(52) U.S. Cl. ...................... 702/151; 702/155; 702/157; 360/71; 360/73.04
(58) Field of Search .................. 702/151, 155, 702/157; 33/141, 142; 360/71, 73.04; 242/345, 341, 336, 338, 340

(56) References Cited

U.S. PATENT DOCUMENTS

| 3,982,160 A | 9/1976 | Goldschmidt et al. |
|---|---|---|
| 4,001,552 A | 1/1977 | Muller |
| 4,159,572 A | 7/1979 | Nunes |
| 4,739,950 A | 4/1988 | Goker et al. |
| 4,814,673 A | 3/1989 | Nguyen |
| 5,576,905 A | 11/1996 | Garcia et al. |
| 5,689,382 A | 11/1997 | Hughes |
| 5,883,772 A | 3/1999 | Kloster |
| 5,909,335 A | 6/1999 | Hardeng et al. |

FOREIGN PATENT DOCUMENTS

| JP | 58-123413 | 7/1983 |
|---|---|---|
| JP | 62-088768 | 4/1987 |
| JP | 01-25331 | 1/1989 |
| WO | WO 96/10252 | 4/1996 |

*Primary Examiner*—John Barlow
*Assistant Examiner*—Meagan Walling (57) ABSTRACT

A method and apparatus for detecting and computing tape reel radius using low-resolution angular position sensors is disclosed. Tape reels are driven at a constant velocity, a complete resolution of the tape reels is detected using coarse commutation sensors and a radius for a first reel, $R_1$, and a radius for a second reel, $R_2$ is calculated according to:

$$R_1 = ((L*T/pi)/(1+T_2^2/T_1^2))^{0.5} \text{ and}$$

$$R_2 = ((L*T/pi)/(1+T_1^2/T_2^2))^{0.5},$$

where L is the total length of tape, T is the thickness of tape, $T_1$ is the rotation time for reel 1, and $T_2$ is the rotation time for reel 2. The calculation of the radius of the two reels using two low resolution (one pulse per turn) sensors results in a great cost and product packaging savings.

13 Claims, 9 Drawing Sheets

METHOD AND APPARATUS FOR DETECTING AND COMPUTING TAPE REEL RADIUS USING LOW-RESOLUTION ANGULAR POSITION SENSORS

BACKGROUND OF THE INVENTION

1. Field of the Invention

This invention relates in general to data storage systems, and more particularly to a method and apparatus for detecting and computing tape reel radius using low-resolution angular position sensors.

2. Description of Related Art

Data loss is a serious threat to companies of all sizes, and catastrophic data loss can destroy a business. But most data loss isn't the result of a big disaster, it's caused by human error, viruses, and disk malfunctions. A suitable backup routine provides the best protection against data loss of all kinds. And tape technology remains the most efficient and cost-effective means to perform system backup, whether for a small business or a global 24×7 operation.

Tape remains unrivaled in terms of cost and capacity for data storage, and should play an increasing crucial role in corporate data protection strategies. No other technology offers the same combined low cost and high capacity advantage of tape. While other technologies may offer strengths in one or more areas, overall, they do not meet the entire set of customer needs that tape addresses.

Tape drives make backup fast, easy, reliable and affordable. Speed is critical because your data is constantly growing while the time available for backup is shrinking. Even the slowest tape drive writes 1 MB per second and the fastest 30 MB per second, which means a 200 GB backup can be completed in less than two hours. Furthermore, unlike other storage methods, tape drives offer a range of media that allows you to back up all the data on a small to medium-sized server. Tape backup also captures system setup information, as well as data, allowing an entire system to be restored in the event a disaster strikes. Also, backups can be scheduled to occur automatically at a time determined to be most convenient.

Another area where tape storage excels is when it comes to data protection. Tape has proved itself a reliable medium, and tape drives themselves have never been more reliable. Easily portable, tapes have the added advantage of being simple to remove and store offsite, so keeping a disaster recovery copy is less of a burden. In terms of affordability, tape is the most cost-effective way to store large amounts of data per gigabyte of storage. The compact size of tape cartridges also helps keep down your storage costs.

Tape motion control in a tape drive, where the tape directly couples a take-up reel and supply reel, requires that the radius of the tape wound on each reel be determined. This is necessary to control tension, position, velocity, and acceleration of the tape when large variation in reel radius occur as the tape is moved from one reel onto the other. The current techniques for determining radius require at least one fine-resolution tachometer and one low resolution tachometer.

Prior techniques, which have been employed in tape drives to determine reel radius of the tape reels in a tape drive, rely on counting the number of fine-line pulses of a digital tachometer connected to one reel that occur during one revolution of the other reel, as signaled by a coarse tachometer, such as one pulse per turn. This count is proportional to the ratio of the reel radii, R1/R2 by the following relationship:

$$N = K(R_2/R_1).$$

where, N=Count of fine line pulses, K=Number of pulses per turn of the fine-line tachometer, $R_1$=Radius of the reel connected to the fine tachometer, and $R_2$=Radius of the reel connected to the one pulse per turn tachometer. This equation, which has two unknowns, $R_1$ and $R_2$, can be solved by employing one other equation derived from the sum of the area of tape wound on the reels. That equation is given by the relationship:

$$R_1^2 + R_2^2 = LT/pi + 2R_0^2$$

where L=Total length of tape and T=Thickness of tape and $R_0$ is the empty reel hub radius. These two equations are employed to solve for $R_1$ and $R_2$ uniquely as:

$$R_1 = ((LT/pi + 2R_0^2)/(1 + N^2/K^2))^{0.5} \text{ and}$$

$$R_2 = ((LT/pi + 2R_0^2)/(1 + K^2/N^2))^{0.5}.$$

However, this technique requires at least one fine line tachometer in order to provide an acceptable measurement resolution for radius which can be updated every revolution of the coarse line tachometer.

Another prior technique employed in the IBM 8809 tape drive uses a single fine line tachometer mounted on a roller in the tape path and driven by the tape. Each reel has a single pulse per turn index pulse tachometer. The number of fine line tachometer pulses are counter for each revolution of the reels. The resulting counts are directly proportional to reel radius.

Additionally, the evolving Linear Tape Open (LTO) technology provides a servo track pre-recorded on the tape which is composed of a repeated regular pattern of flux transitions. The new LTO tape product uses a tape format that has longitudinally pre-written servo tracks. The servo tracks provide a timing-based track-following position error system. The tracks contain a repeated pattern of recorded flux transitions that occur as grouped bursts of 5, 5, 4, and 4 transitions. The timing between the sets of 5-bursts and between sets of 4-bursts provides the position information for the track following system. Additionally, the individual transitions within the 5-bursts are phase-shifted in a manner that encodes longitudinal position information (LPOS) into the servo tracks.

By detecting the phase-encoded LPOS information, the tape transport system determines the tape position relative to landmarks lengthwise down the tape. The LPOS information is used to keep track of the longitudinal position of data records written onto or read from the tape, and is used to locate those data records when the reading or writing process temporarily stops. The LPOS location of data files on tape is also stored in the volume control data for use to locate the data files during a later tape cartridge load for reading, or for write-appending new files onto the end of the last file written to the tape. The LPOS data is thus used as the primary positional information for the tape transport servo control system, it is used in the decision process for starting and stopping the tape, and for backhitching the tape in order to position the read-write heads at the beginning of a data record at the required velocity and track position which allows the start of a new data transfer operation.

Moreover, this servo track can be used to compute the radius of the two reels. However there can be long lengths of time when the servo track is not available. During such times, reel radius must somehow be detected from sensors of mechanical motion of the tape transport hardware.

It can be seen that there is a need for a method and apparatus for detecting and computing tape reel radius using low-resolution angular position sensors.

SUMMARY OF THE INVENTION

To overcome the limitations in the prior art described above, and to overcome other limitations that will become apparent upon reading and understanding the present specification, the present invention discloses a method and apparatus for detecting and computing tape reel radius using low-resolution angular position sensors.

The present invention solves the above-described problems by calculating the radius of the two reels using two low resolution (one pulse per turn) sensors. This results in a great cost and product packaging savings.

A method in accordance with the principles of the present invention includes driving tape reels at a constant velocity, detecting a complete rotation of each of the tape reels using coarse commutation sensors and calculating a radius for a first reel, R1, and a radius for a second reel, R2 according to:

$$R_1 = ((L*T/pi)/(1+T_2^2/T_1^2))^{0.5} \text{ and}$$

$$R_2 = ((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

Other embodiments of a method in accordance with the principles of the invention may include alternative or optional additional aspects. One such aspect of the present invention is that the coarse commutation sensors comprise Hall effect sensors.

In another embodiment of the present invention, a method of detecting and computing tape reel radius is disclosed. The method includes computing tape reel radii using servo track burst of flux transitions when servo tracking is available as a basis for radii computations and computing tape reel radii using a secondary velocity source when servo tracking not is available as a basis for radii computations.

Another aspect of the present invention is that the computing tape reel radii using a secondary velocity source further includes driving tape reels at a constant velocity, detecting a complete rotation of each of the tape reels using coarse commutation sensors and calculating a radius for a first reel, $R_1$, and a radius for a second reel, $R_2$, according to:

$$R_1 = ((L*T/pi)/(1+T_2^2/T_1^2))^{0.5} \text{ and}$$

$$R_2 = ((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

Another aspect of the present invention is that the coarse commutation sensors comprise Hall effect sensors.

In another embodiment of the present invention, a tape drive configured for detecting and computing tape reel radii is disclosed. The tape drive includes a first and second tape reel motor, a commutation sensor, coupled to the each of the first and second tape reel motors, for detecting a complete revolution of a first and second tape reel and for providing an index signal in response thereto and a controller, coupled to the first and second tape reel motors, the controller driving the tape reel motors at a constant velocity and receiving the index signal for each of the first and second tape reels, wherein the controller computes a first tape reel radius, $R_1$ and a second tape reel radius, $R_2$, according to:

$$R_1 = ((L*T/pi)/(1+T_2^2/T_1^2))^{0.5} \text{ and}$$

$$R_2 = ((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

Another aspect of the present invention is that the coarse commutation sensors comprise Hall effect sensors.

Another aspect of the present invention is that the tape drive further includes a motor driver disposed between each of the first and second tape reel motors and the controller.

In another embodiment of the present invention, an article of manufacture comprising a program storage medium readable by a computer is disclosed. The medium tangibly embodies one or more programs of instructions executable by the computer to perform a method for detecting and computing tape reel radii using low resolution angular position sensors, wherein the method includes driving tape reels at a constant velocity, detecting a complete rotation of each of the tape reels using coarse commutation sensors and calculating a radius for a first reel, $R_1$, and a radius for a second reel, $R_2$, according to:

$$R_1 = ((L*T/pi)/(1+T_2^2/T_1^2))^{0.5} \text{ and}$$

$$R_2 = ((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

In another embodiment of the present invention, an article of manufacture comprising a program storage medium readable by a computer is disclosed. The medium tangibly embodies one or more programs of instructions executable by the computer to perform a method for detecting and computing tape reel radius, wherein the method includes computing tape reel radii using servo track burst of flux transitions when servo tracking is available as a basis for radii computations and computing tape reel radii using a secondary velocity source when servo tracking not is available as a basis for radii computations.

Another aspect of the present invention is that the computing tape reel radii using a secondary velocity source further includes driving tape reels at a constant velocity, detecting a complete rotation of each of the tape reels using coarse commutation sensors and calculating a radius for a first reel, $R_1$, and a radius for a second reel, $R_2$, according to:

$$R_1 = ((L*T/pi)/(1+T_2^2/T_1^2))^{0.5} \text{ and}$$

$$R_2 = ((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for apparatus for detecting and computing tape reel radius using low-resolution angular position sensors. The present invention calculates the radius of the two reels using two low resolution (one pulse per turn) sensors, which results in a great cost and product packaging savings.

Figure 1:
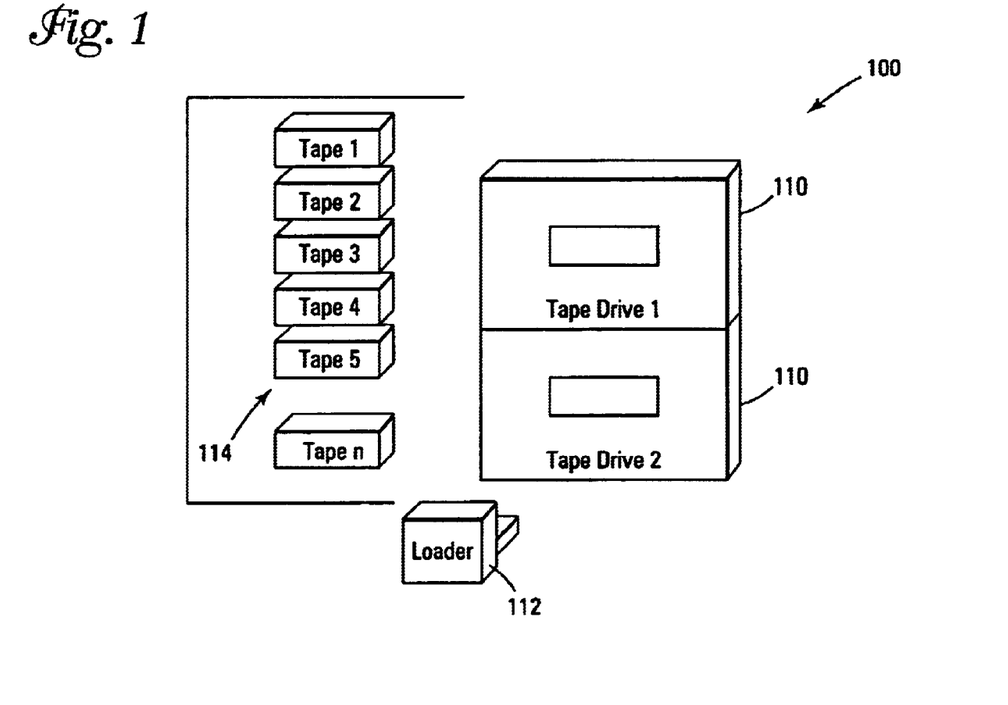
FIG. 1 illustrates a tape library system according to the present invention.

FIG. 1 illustrates a tape library system 100. The tape library system 100 includes at least one tape drive 110, a loader 112, and a library of tape cassettes or cartridges 114 that can be accessed by the loader 112 so as to load the tape drive 110 with an appropriately identified tape cassette or cartridge.

Figure 2:
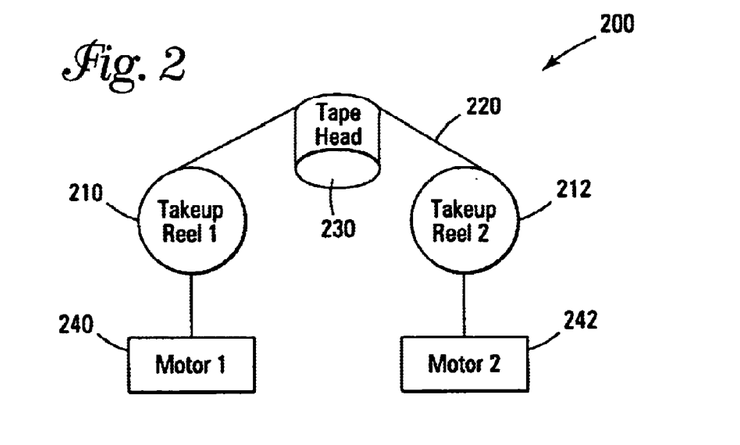
FIG. 2 illustrates a tape system according to the present invention.

FIG. 2 illustrates a tape system 200. The tape system 200 includes a first and second takeup reel 210, 212. Magnetic recording tape 220 is spooled on the first and second takeup reels 210, 212. The magnetic recording tape 220 is routed over a tape read/write head 230 for reading and writing data on the magnetic recording tape 220. Takeup reel motors 240, 242 control the positioning of the magnetic recording tape 220 over the tape read/write head 230.

Figure 3:
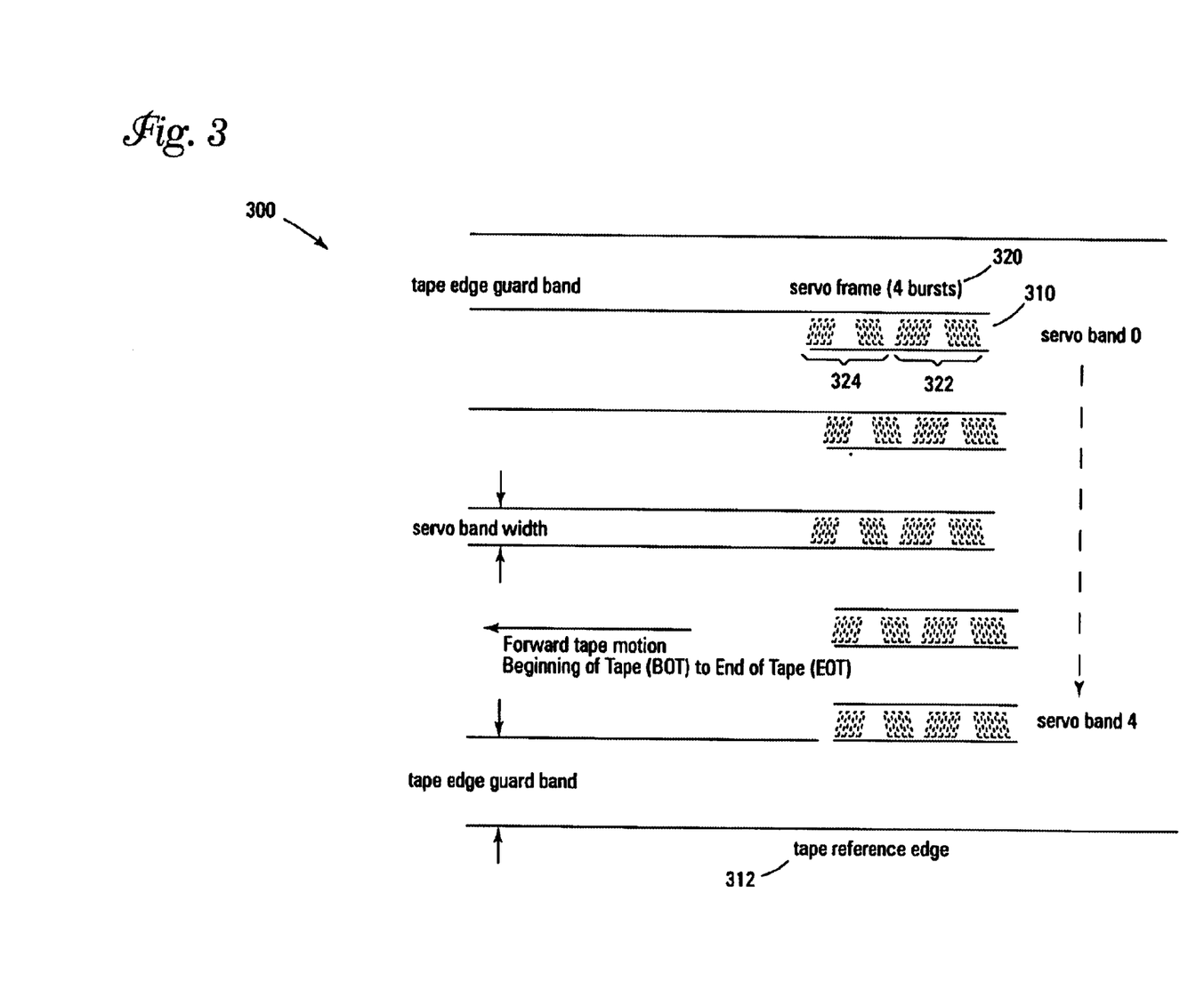
FIG. 3 illustrates the recording format according to the present invention.

According to the present invention, a tape drive uses an interleaved, serpentine, longitudinal recording format. FIG. 3 illustrates the recording format 300 according to the present invention. The first set of eight data tracks is written from near the physical beginning of the tape to near the physical end of the tape. The head then repositions to the next set of tracks for the return. This process continues until all tracks are written and the tape is full.

Servo tracks (also called bands) 310 enable accurate positioning of the tape drive head over the data track, ensuring that the head does not stray onto an adjacent track. They are necessary to support high data densities on the tape where the tracks are very close together. The servo bands 310 are written at time of manufacture of the cartridge, prior to the cartridge being usable for data storage and retrieval.

There are five servo bands, numbered 0 through 4, which make up the servo tracking mechanism on the tape. They are each located at specific distances from the tape reference edge 312. Within the servo bands are servo stripes, groups of which make up servo bursts. Four servo bursts 320 make up a servo frame; the first two bursts 322 (as written in the forward tape motion direction) contain five servo stripes and the second two bursts 324 contain four servo stripes.

Figure 4:
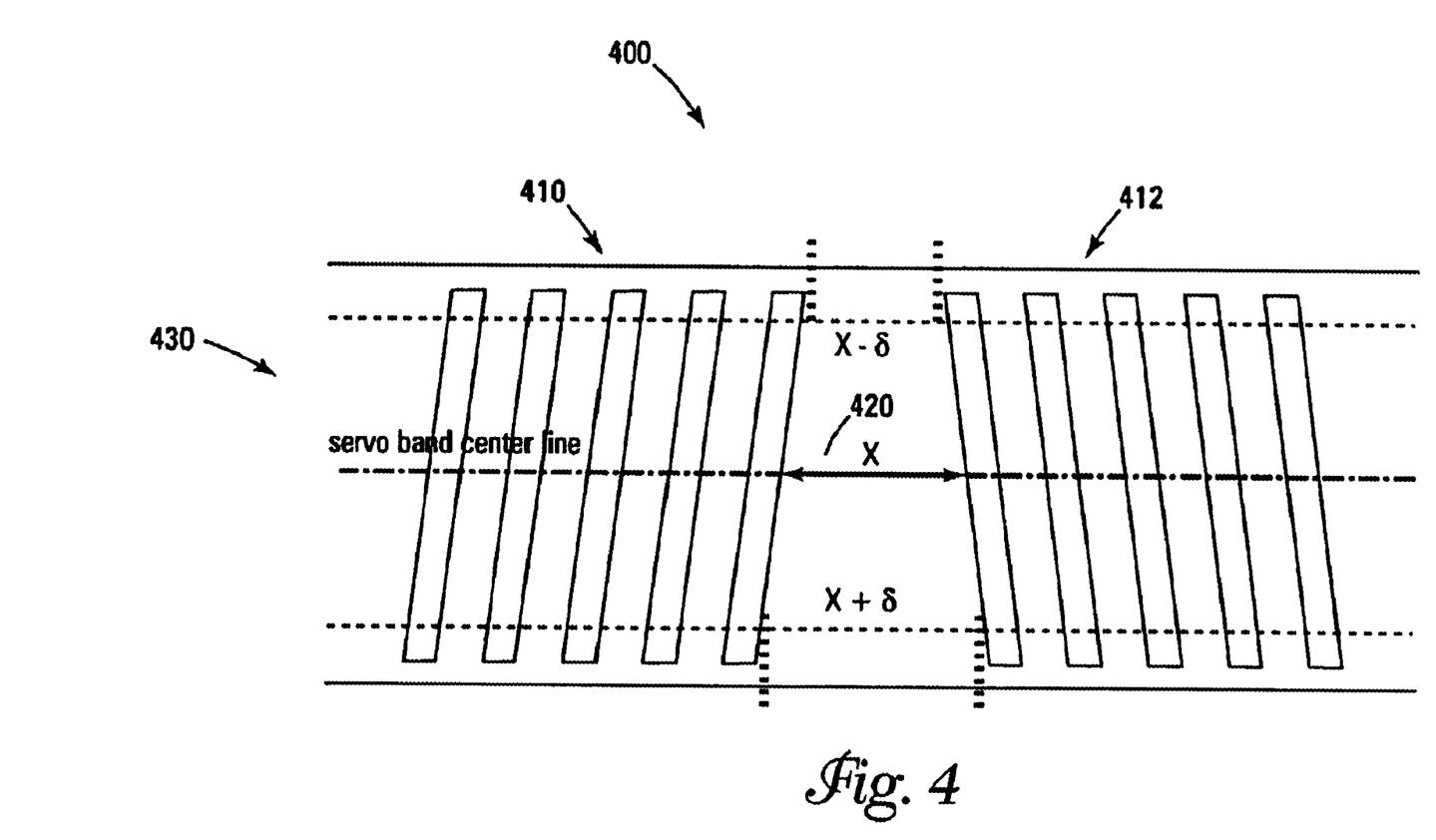
FIG. 4 illustrates a pair of servo burst according to the present invention.

FIG. 4 illustrates a pair of servo burst 400 according to the present invention. The servo bursts pairs 410, 412 are at an angle to each other, and the servo heads move such that they keep a constant value 420 for the distance between the bursts. In this way the servo is able to follow a straight line within the servo band 430. Any small deviation away from the correct path causes a variation (plus or minus) in the gap between the bursts, e.g., x−δ or x+δ. Provided that the servo head element follows a straight line along the servo band, then the distance "x" 420 shown in FIG. 4 remains constant. Two servo bands are used simultaneously to provide two sources of servo information for increased accuracy.

In reality, the format specifies six nominal servo positions within each servo band, and, in addition, the servo head is made up of two servo head elements to address a single servo band. This means that, using the two elements, the servo head is able to reposition within the servo band 430 for the six forward and reverse data wraps within each data band. The distance between each servo position corresponds to the distance apart that the data tracks are written. This technology can be very finely tuned and is capable of supporting very high track densities using the same servo tracks because the currently used and defined six nominal positions are basically definitions of six different "x distances" 420 between servo bursts and not a fixed servo track. By defining additional "x distance" positions 420, it is possible to increase the number of tracks on a cartridge while still using the same cartridge and servo tracks.

Figure 5:
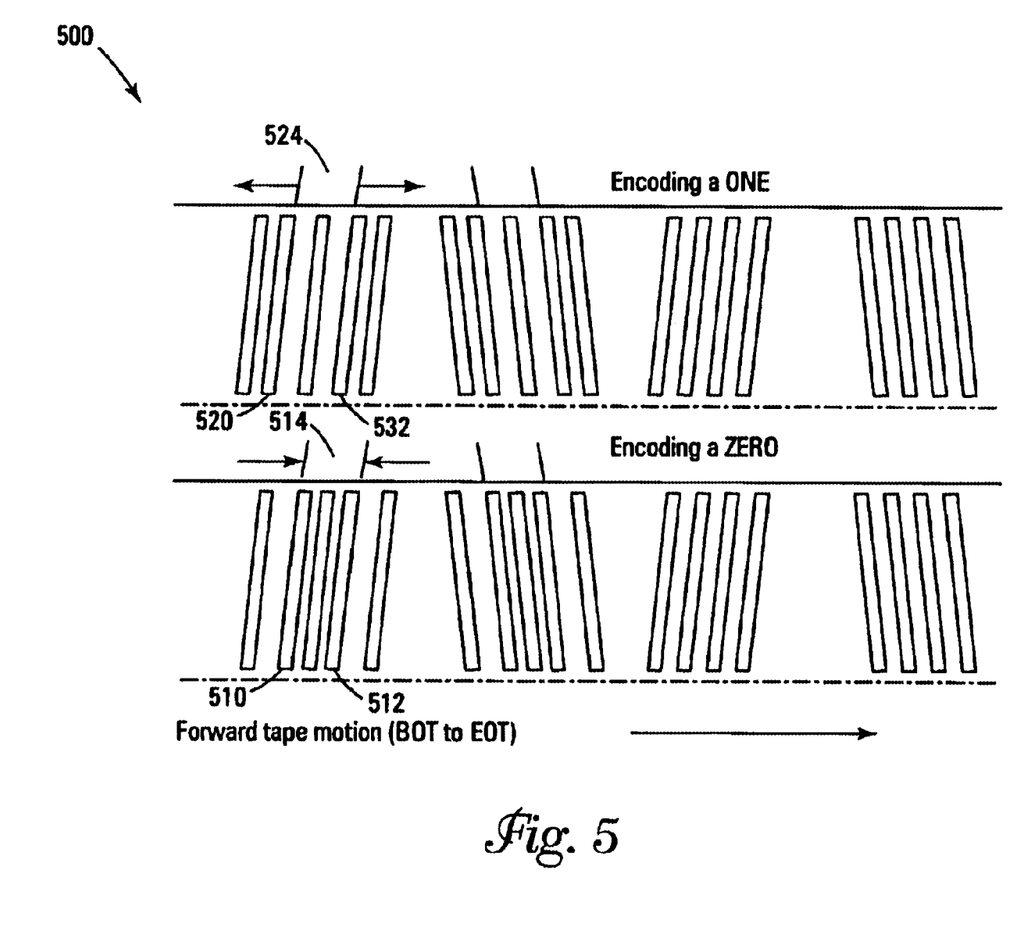
FIG. 5 illustrates the encoding of bits using the servo stripes within the servo bursts according to the present invention.

FIG. 5 illustrates the encoding of bits using the servo stripes within the servo bursts 500 according to the present invention. The servo band is designed not only for track following but also for recording the longitudinal position (LPOS). The absolute location down the length of the tape and the manufacturer data are recorded in LPOS "words", approximately every quarter of an inch (0.7 cm) along the tape. The LPOS word consists of symbols constructed from bit sequences (ones and zeros); these bits are encoded within the servo frames.

Each servo frame encodes one bit using the first pair of servo bursts. When servo stripes 2 510 and 3 512 (out of the five) are shifted inwards 514, this encodes a zero; when servo stripes 2 520 and 3 522 are shifted outwards 524, this encodes a one. The LPOS word contains 36 bits and thus has a length of 36 servo frames. Each of the 5 servo bands on the tape may be uniquely identified by the relative positions of the frames down the tape, in adjacent servo bands. The offset of the frames between servo band 'n' and servo band 'n+1' are specific to each servo band (0 and 1, 1 and 2, 2 and 3, or 3 and 4). Thus the drive can move the head directly from the physical beginning of the tape to a specific logical position for reading or writing.

Figure 6:
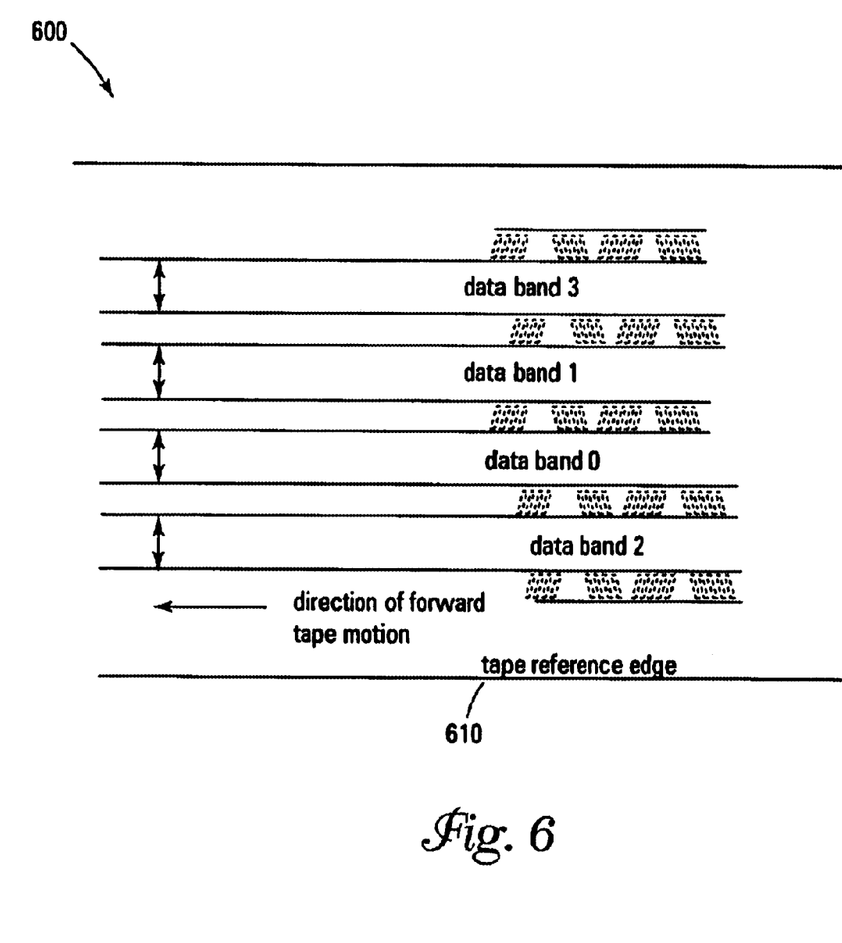
FIG. 6 illustrates the area between adjacent servo bands that is defined as the data bands according to the present invention.

FIG. 6 illustrates the area between adjacent servo bands that is defined as the data bands 600. There are 4 data bands numbered 2, 0, 1, and 3, where data band number 2 is nearest the reference edge 610 of the tape and data band 3 is furthest away. The data bands are written in sequence beginning with 0 (in the center of the tape) and ending with 3.

Each data band consists of 96 tracks which are recorded 8 tracks at a time from one end of the tape to the other in the following way:

- The head is positioned over data band 0, and the first set of 8 tracks are written from the physical beginning of the tape to the physical end.
- The head physically repositions (using a different servo position within the same servo bands) and switches electronically to a second set of 8 write elements in order to write 8 tracks in the reverse direction back to the physical beginning of the tape.
- The head physically repositions again, and, switching back to the first set of write elements, writes another set of 8 tracks to the physical end of the tape.
- The head continues to switch and index in this manner until all 96 tracks are written and the head is back at the physical beginning of the tape.
- The head moves to data band 1 to continue writing the data.

A group of tracks recorded concurrently in the physical forward or the physical backward direction is called a wrap. Wraps recorded while the tape is moving from BOT to EOT are forward wraps; wraps recorded while the tape is moving from EOT to BOT are reverse wraps. The wraps are recorded in a serpentine fashion, as described—a forward wrap, then a reverse wrap. They are numbered sequentially in the order that they are processed, starting with wrap 0. Thus there are 6 forward wraps making up a data band and 6 reverse wraps. The individual tracks within a wrap are interleaved with tracks from other wraps; in other words, adjacent tracks are not part of the same wrap.

Figure 7:
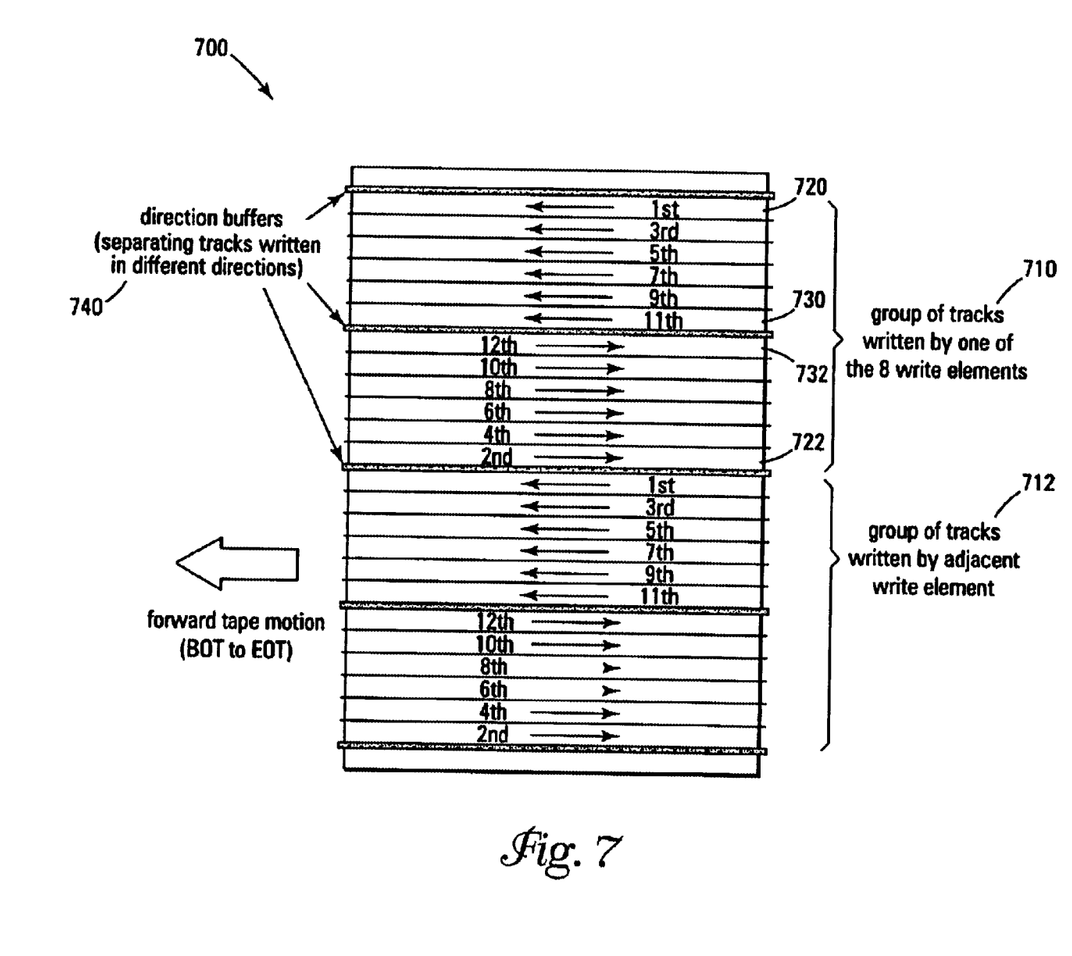
FIG. 7 is a magnified view of the data band illustrated in FIG. 6 showing the sequence of a data band in which the tracks are written.

FIG. 7 expands on FIG. 6 to illustrate the sequence of a data band 700 in which the tracks are written. One data band 700 is magnified to show a first area 710 written by a first of one of the 8 write elements and a second area 712 written by an adjacent write element. This is one quarter of the width of the data band. You can see that the tracks are written in an inward spiral (serpentine) manner; the 1st 720 and 2nd 722 tracks are furthest away from one another while the 11th 730 and 12th 732 tracks are adjacent to one another. The space between tracks written in opposing directions is called a direction buffer 740. This space is designed to minimize magnetic interference between tracks written in opposite directions (cross-track interference).

Read/verify elements are built into the tape head in the drive. The data is written by the write elements and then immediately passes the read/verify elements and is checked for errors. If any errors are found the block of data is rewritten further down the tape. The total number of data tracks across the width of the tape is 384, and they are numbered 0 through 383. The track numbering is not relating to the sequence in which the tracks are written, data track 383 being the data track closest to the reference edge of the tape, and data track 0 being furthest away.

Figure 8:
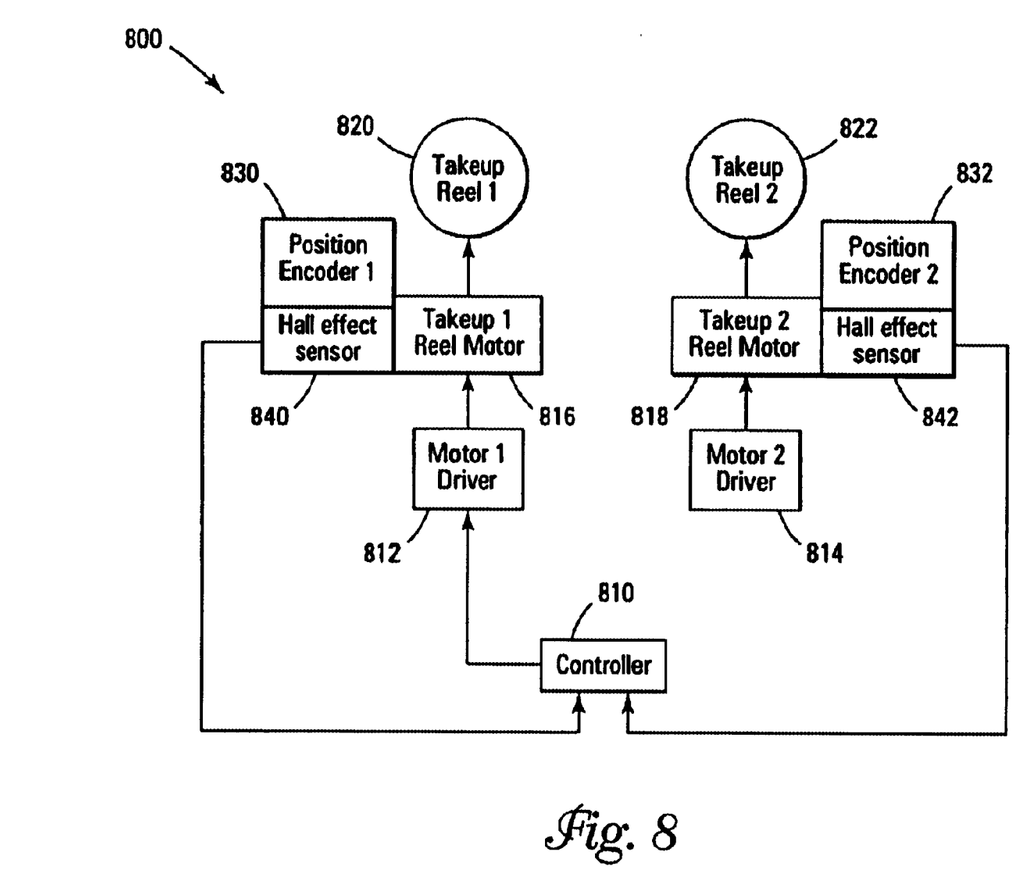
FIG. 8 illustrates a block diagram of a tape storage system according to the present invention.

FIG. 8 illustrates a block diagram of a tape storage system 800 according to the present invention. The tape storage system 800 employs two coarse resolution rotation sensors 840, 842 which each provide one pulse per revolution. A controller 810 provides control signals to motor driver 1 812 and motor driver 2 814. Motor driver 1 812 and motor driver 2 814, in turn, provide drive signals to takeup reel motor 1 816 and takeup reel motor 2 818. The takeup reel motor 1 816 and takeup reel motor 2 818 control the position of tape takeup reel 1 820 and takeup reel 2 822. Position encoder 1 830 and position encoder 832 are provided. The commutation sensors for the brushless motor are typically Hall sensors 840, 842, which provide low angular resolution, and poor accuracy for each Hall individual state. For example, the resolution of the hall sensors 840, 842 may be as low as 24 hall states per revolution of the motor. However these sensors 840, 842 can be used to reliably derive an index pulse for reel rotation, which provides an accurate signal for one full revolution of each reel. It is this index pulse which is used to provide the measurement basis for this technique for detecting and computing the radius of the two tape reels. The elimination of the fine sensors sensing angular position provides a great savings in hardware cost and packaging. The space requirement for fine line sensors makes physical packaging impossible within the constraints of the 5¼ inch form factor, given the LTO cartridge format.

When the tape speed is constant over the measurement period, the rotation time of each reel is directly proportional to the reel radius as given in the following relationships.

$$T_1 = 2*pi*R_1/V \text{ and,}$$

$$T_2 = 2*pi*R_2/V,$$

where $T_1$ is the rotation time for reel 1, $T_2$ is the rotation time for reel 2 and V is the velocity during the time measurements.

The ratio of the two rotation time measurements, $T_1$ and $T_2$, can be calculated yielding a relationship that removes the variable V as follows.

$$T_1T_2 = R_1/R_2.$$

This result is important for a tape transport system which has no fine line tachometers, since it does not include tape velocity in the formula. The measurement is independent of the tape velocity while the rotation times are measured, the only requirement being that the velocity be constant and of the same value during the measurement of each rotation time. The resulting radius ratio is used to compute the radius of each reel uniquely by employing the sum of the area of tape wound on the two reels as is done in the prior art. The solution for each reel radius is given by the formulas, $$R_1 = ((L*T/pi)/(1+T_2^2/T_1^2))^{0.5} \text{ and}$$

$$R_2 = ((L*T/pi)/(1+T_1^2/T_2^2))^{0.5}.$$

In a tape drive where there are no fine line tachometers, the tape velocity must be derived and controlled from a source other than tachometers. In the LTO tape technology, a servo track is available for this purpose, providing a primary velocity source. However it is not always available. The tape drive must be designed to reliably move tape and control velocity over very long lengths of tape, often from end-to-end of tape without the benefit of the servo track. In this mode, a secondary velocity source is used which requires knowledge of the radius of the two reels. The radius information for the two reels is used to compute secondary velocity. Therefore, reel radius computation method must be independent of tape velocity.

Figure 9:
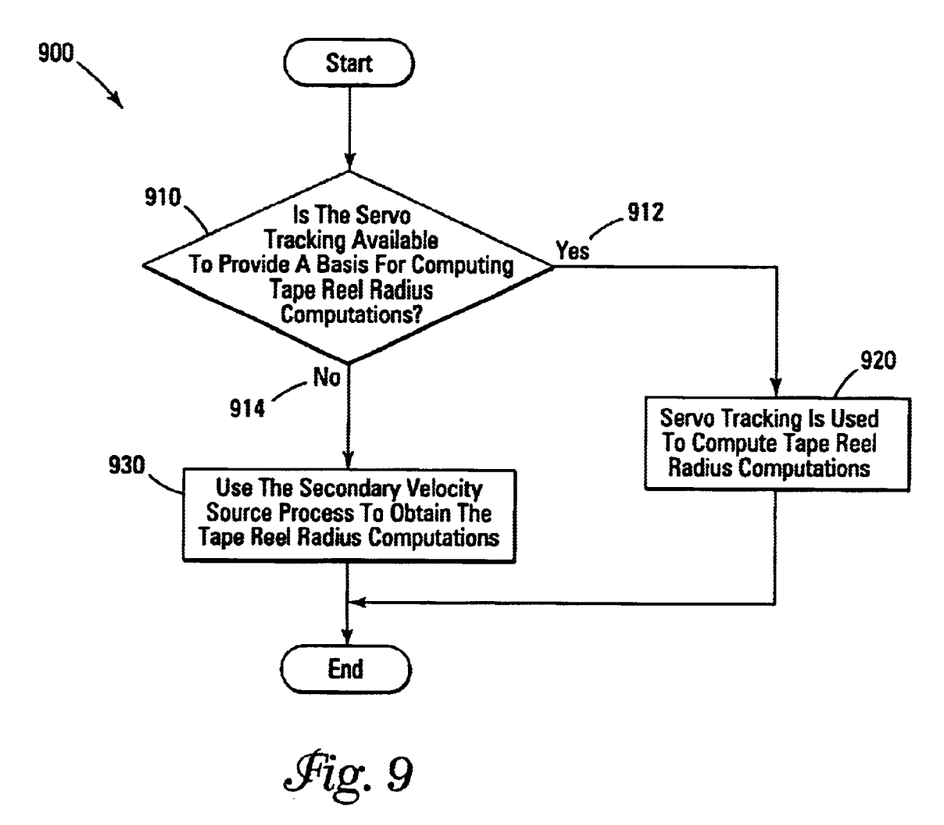
FIG. 9 illustrates a flow chart for detecting and computing tape reel radius according to the present invention.

FIG. 9 illustrates a flow chart for detecting and computing tape reel radius according to the present invention. First, a determination is made whether the servo tracking is available to provides a basis for computing tape reel radius computations 910. If yes 912, then the servo tracking is used to compute tape reel radius computations 920. If not 914, then the secondary velocity source process must be used to obtain the tape reel radius computations 930.

Figure 10:
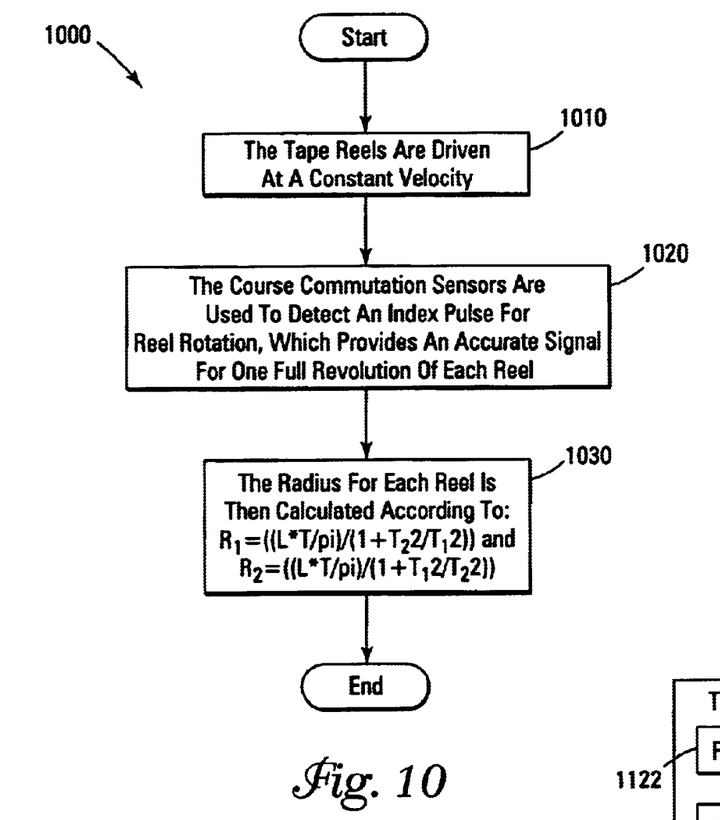
FIG. 10 is a flow chart of the secondary velocity source process for obtaining tape reel radius computations according to the present invention.

FIG. 10 is a flow chart 1000 of the secondary velocity source process for obtaining tape reel radius computations according to the present invention. First, the tape reels are driven at a constant velocity 1010. When the tape speed is constant over the measurement period, the rotation time of each reel is directly proportional to the reel radius. The course commutation sensors are used to detect an index pulse for reel rotation, which provides an accurate signal for one full revolution of each reel 1020. The radius for each reel is then calculated according to:

$$R_1=((L*T/pi)/(1+T_2^2/T_1^2))^{0.5} \text{ and}$$

$$R_2=((L*T/pi)/(1+T_1^2/T_2^2))^{05}.$$

The calculated radii is then used to control tension, position, velocity, and acceleration of the tape.

Figure 11:
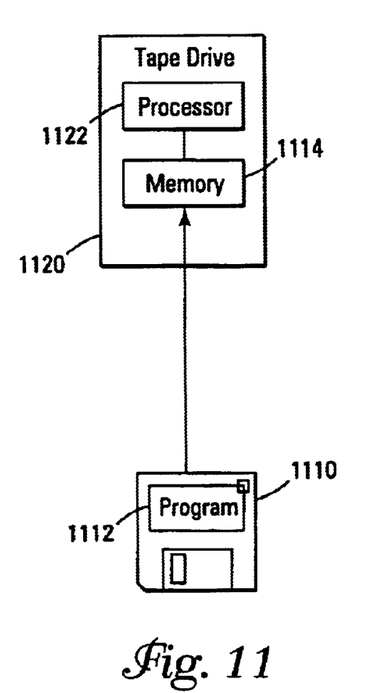
FIG. 11 is a block diagram that illustrates an exemplary hardware environment for detecting and computing tape reel radius using low-resolution angular position sensors according to the present invention.

The process illustrated with reference to FIGS. 8–10 may be tangibly embodied in a computer-readable medium or carrier, e.g. one or more of the fixed and/or removable data storage devices 1110 illustrated in FIG. 11, or other data storage or data communications devices. A computer program 1112 on the storage device 1110 may be loaded into the memory 1114 or into the storage device 1110 to configure the storage system 110, as illustrated in FIG. 1, for execution. The computer program 1112 comprise instructions which, when read and executed by a processor 1122 of the tape drive 110, as illustrated in FIG. 1, causes the tape drive 110, as illustrated in FIG. 1, to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for detecting and computing tape reel radii using low resolution angular position sensors, comprising:

driving tape reels at a constant velocity;

detecting a complete resolution of the tape reels using coarse commutation sensors; and calculating a radius for a first reel, $R_1$, and a radius for a second reel, $R_2$, according to:

$$R_1=((L*T/pi)/(1+T_2^2/T_1^2))^{0.5} \text{ and}$$

$$R_2=((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

2. The method of claim 1 wherein the coarse commutation sensors comprise Hall effect sensors.

3. A method of detecting and computing tape reel radius, comprising:

computing tape reel radii using servo track burst of flux transitions when servo tracking is available as a basis for radii computations; and computing tape reel radii using a secondary velocity source when servo tracking not is available as a basis for radii computations.

4. The method of claim 3 wherein the computing tape reel radii using a secondary velocity source further comprises:

driving tape reels at a constant velocity;

detecting a complete resolution of the tape reels using coarse commutation sensors; and calculating a radius for a first reel, $R_1$, and a radius for a second reel, $R_2$ according to:

$$R_1=((L*T/pi)/(1+T_2^2/T_1^2))^{0.5} \text{ and}$$

$$R_2=((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

5. The method of claim 4 wherein the coarse commutation sensors comprise Hall effect sensors.

6. A tape drive configured for detecting and computing tape reel radii, comprising:

a first and second tape reel motor;

a commutation sensor, coupled to the each of the first and second tape reel motors, for detecting a complete revolution of a first and second tape reel and for providing an index signal in response thereto; and a controller, coupled to the first and second tape reel motors, the controller driving the tape reel motors at a constant velocity and receiving the index signal for each of the first and second tape reels, wherein the controller computes a first tape reel radius, $R_1$ and a second tape reel radius, $R_2$, according to:

$$R_1=((L*T/pi)/(1+T_2^2/T_1^2))^{0.5} \text{ and}$$

$$R_2=((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

7. The tape drive of claim 6 wherein the coarse commutation sensors comprise Hall effect sensors.

8. The tape drive of claim 7 further comprising a motor driver disposed between each of the first and second tape reel motors and the controller.

9. An article of manufacture comprising a program storage medium readable by a computer, the medium tangibly embodying one or more programs of instructions executable by the computer to perform a method for detecting and computing tape reel radii using low resolution angular position sensors, the method comprising:

driving tape reels at a constant velocity;

detecting a complete resolution of the tape reels using coarse commutation sensors; and calculating a radius for a first reel, $R_1$, and a radius for a second reel, $R_2$ according to:

$$R_1 = ((L*T/pi)/(1+T_2^2/T_1^2))^{0.5} \text{ and}$$

$$R_2 = ((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

10. The article of manufacture of claim 9 wherein the coarse commutation sensors comprise Hall effect sensors.

11. An article of manufacture comprising a program storage medium readable by a computer, the medium tangibly embodying one or more programs of instructions executable by the computer to perform a method for detecting and computing tape reel radius, the method comprising:

computing tape reel radii using servo track burst of flux transitions when servo tracking is available as a basis for radii computations; and computing tape reel radii using a secondary velocity source when servo tracking not is available as a basis for radii computations.

12. The article of manufacture of claim 11 wherein the computing tape reel radii using a secondary velocity source further comprises:

driving tape reels at a constant velocity;

detecting a complete resolution of the tape reels using coarse commutation sensors; and calculating a radius for a first reel, $R_1$, and a radius for a second reel, $R_2$ according to:

$$R_1 = ((L*T/pi)/(1+T_2^2/T_1^2))^{0.5} \text{ and}$$

$$R_2 = ((L*T/pi)/(1+T_1^2/T_2^2))^{0.5},$$

where L is the total length of tape, T is the thickness of tape, $T_1$ is the rotation time for reel 1, and $T_2$ is the rotation time for reel 2.

13. The article of manufacture of claim 4 wherein the coarse commutation sensors comprise Hall effect sensors.

* * * * *

UNITED STATES PATENT AND TRADEMARK OFFICE
CERTIFICATE OF CORRECTION

PATENT NO. : 6,622,113 B2
DATED : September 16, 2003
INVENTOR(S) : Koski et al.

It is certified that error appears in the above-identified patent and that said Letters Patent is hereby corrected as shown below:

<u>Title page,</u>
Item [75], Inventors, should read -- John Alexander Koski, Livermore, CA (US), Akimitsu Sasaki, Yokohama-shi (JP) --.

<u>Drawings,</u>
Fig. 5, "532" should read -- 522 --.

Signed and Sealed this

Second Day of March, 2004

JON W. DUDAS
*Acting Director of the United States Patent and Trademark Office*